United States Patent
Haimer et al.

(10) Patent No.: US 10,376,969 B2
(45) Date of Patent: Aug. 13, 2019

(54) ROTARY CUTTING TOOL

(71) Applicant: FRANZ HAIMER MASCHINENBAU KG, Igenhausen (DE)

(72) Inventors: Franz-Josef Haimer, Igenhausen (DE); Reinhold Sanhieter, Hohenwart (DE)

(73) Assignee: FRANZ HAIMER MASCHINENBAU KG, Igenhausen (DE)

( * ) Notice: Subject to any disclaimer, the term of this patent is extended or adjusted under 35 U.S.C. 154(b) by 46 days.

(21) Appl. No.: 15/319,698

(22) PCT Filed: Jun. 11, 2015

(86) PCT No.: PCT/EP2015/063080
§ 371 (c)(1),
(2) Date: Dec. 16, 2016

(87) PCT Pub. No.: WO2015/193173
PCT Pub. Date: Dec. 23, 2015

(65) Prior Publication Data
US 2017/0120349 A1    May 4, 2017

(30) Foreign Application Priority Data
Jun. 17, 2014   (DE) .................. 10 2014 108 513

(51) Int. Cl.
B23C 5/10    (2006.01)

(52) U.S. Cl.
CPC .......... B23C 5/10 (2013.01); *B23C 2210/241* (2013.01); *B23C 2210/402* (2013.01)

(58) Field of Classification Search
CPC ............... B23C 5/10; B23C 2210/241; B23C 2210/402; B23B 51/02; B23B 2251/245; B23B 2251/244; B23B 2251/241
See application file for complete search history.

(56) References Cited

U.S. PATENT DOCUMENTS

| 374,432 | A | * | 12/1887 | Simmons | ............... | B27G 15/00 |
| | | | | | | 408/213 |
| 2,930,264 | A | * | 3/1960 | Lovret | ................... | B23D 77/00 |
| | | | | | | 408/229 |

(Continued)

FOREIGN PATENT DOCUMENTS

| CN | 101920354 A | 12/2010 | | |
| DE | 29724063 U1 | * | 11/1999 | ............. B23B 51/02 |

(Continued)

OTHER PUBLICATIONS

Description JP2002144122 (translation) obtained at https://worldwide.espacenet.com/ (last visited Jul. 5, 2018).*

(Continued)

*Primary Examiner* — Ryan C Rufo
(74) *Attorney, Agent, or Firm* — Paul D. Bianco; Gary S. Winer; Fleit Gibbons Gutman Bongini & Bianco PL (57) ABSTRACT

A rotary cutting tool having an axis of rotation, a shank area, and a cutting area. The rotary tool has chip flutes reaching as far as a core profile in the cutting area. In order to reduce vibrations of the rotary cutting tool and therefore to permit precise machining and high surface quality with long service lives, the center line of the core profile has a course that deviates from the axis of rotation of the rotary cutting tool and/or the core profile contains mutually alternating sections with increasing cross-sectional area and sections with decreasing cross-sectional area over the length of the cutting area.

8 Claims, 5 Drawing Sheets

(56) References Cited

U.S. PATENT DOCUMENTS

| | | | |
|---|---|---|---|
| 4,190,386 A * | 2/1980 | Brabetz | B23B 51/02 279/6 |
| 4,285,618 A | 8/1981 | Shanley, Jr. | |
| 4,538,989 A * | 9/1985 | Apairo, Jr. | A61C 5/42 433/102 |
| 5,678,960 A * | 10/1997 | Just | B23B 51/02 408/147 |
| 5,713,736 A * | 2/1998 | Heath | A61C 5/42 408/230 |
| 5,888,036 A * | 3/1999 | Arai | B23B 51/02 408/230 |
| 6,250,857 B1 * | 6/2001 | Kersten | B23B 51/02 175/394 |
| 6,675,917 B2 | 1/2004 | Kleine et al. | |
| 6,742,968 B1 | 6/2004 | Volokh | |
| 7,163,363 B2 | 1/2007 | Defougeres | |
| 7,399,147 B1 | 7/2008 | VanDyke, Jr. | |
| 9,277,925 B2 * | 3/2016 | Scianamblo | B23B 51/0081 |
| 2002/0040813 A1 | 4/2002 | Kleine | |
| 2003/0159544 A1 | 8/2003 | Moser et al. | |
| 2004/0052597 A1 | 3/2004 | Defougeres et al. | |
| 2004/0120777 A1 * | 6/2004 | Noland | B23C 5/10 407/63 |
| 2010/0209200 A1 * | 8/2010 | Delacretaz | A61C 3/02 407/54 |
| 2010/0221078 A1 * | 9/2010 | Borschert | B23B 51/009 408/1 R |
| 2012/0039677 A1 * | 2/2012 | Davis | B23C 5/10 407/54 |
| 2013/0170920 A1 * | 7/2013 | Ogawa | B23B 51/02 408/1 R |
| 2013/0315681 A1 | 11/2013 | Volokh | |

FOREIGN PATENT DOCUMENTS

| | | | | |
|---|---|---|---|---|
| DE | 10050229 C1 | 2/2002 | | |
| DE | 60125363 T2 | 9/2007 | | |
| DE | 10 2009 023 299 A1 | 12/2010 | | |
| DE | 102009023299 A1 * | 12/2010 | | B23B 51/02 |
| EP | 1072345 A2 | 1/2001 | | |
| EP | 1340573 A1 | 9/2003 | | |
| JP | 2002-144122 A * | 5/2002 | | B23B 51/00 |
| JP | 2013202748 A | 10/2013 | | |
| WO | WO 2010125881 A1 * | 11/2010 | | B23B 51/02 |
| WO | WO 2012111004 A2 * | 8/2012 | | B23B 51/02 |

OTHER PUBLICATIONS

Description DE29724063 (translation) obtained at https://worldwide.espacenet.com/ (last visited Jul. 5, 2018).*
English translation of Written Opinion for PCT/EP2015/063080 filed Jun. 11, 2015.
International Search Report dated Sep. 10, 2015 for PCT/EP2015/063080 filed Jun. 11, 2015.
Written Opinion dated Dec. 23, 2015 for PCT/EP2015/063080 filed Jun. 11, 2015.
Database WP XP002744277, Dec. 22, 2012.
Database XP002744278, Oct. 7, 2013.
English translation of International Preliminary Report on Patentability dated Dec. 20, 2016 for PCT/EP2015/063080 filed Jun. 11, 2015.

* cited by examiner

ROTARY CUTTING TOOL

FIELD OF THE INVENTION

The present invention relates to a rotary cutting tool.

BACKGROUND OF THE INVENTION

US 2013/0315681 discloses a rotary cutting tool in the form of a twist drill, having an axis of rotation, a shank area and a cutting area. Disposed in the cutting area of the twist drill is a plurality of chip flutes which extend inwardly as far as a core profile. Throughout the length of the cutting area, there is a section in which the cross-sectional area of the core profile increases and a section in which the cross-sectional area of the core profile decreases. However, because of the drastically reduced cross-sectional area in the transition zone to the shank area, the stability of the twist drill both against lateral forces and against torsional forces is markedly reduced. As a result, vibrations are more likely to be generated, which have a negative effect on the service life and the machining quality.

SUMMARY OF THE INVENTION

A low-vibration rotary cutting tool which allows precise machining and high surface quality and which has a long service life is disclosed.

Other embodiments of the invention are also disclosed.

The rotary cutting tool according to the present invention is characterized in that the center line of the core profile follows a path that deviates from the axis of rotation of the rotary cutting tool and/or that the core profile, throughout the length of the cutting area, comprises a plurality of alternately disposed sections with an increasing cross-sectional area and sections with a decreasing cross-sectional area. Both the asymmetrical configuration of the core profile relative to the axis of rotation and the arrangement of a plurality of alternately disposed sections with an increasing and decreasing cross-sectional area of the core profiles, independently, have the effect of markedly improving the damping of vibrations and chip breakage, without notably reducing stability. When both of these are used in combination with each other, an additional advantage is obtained in that the mass distribution in the cutting area can be optimally adjusted, thereby improving the damping of vibrations of the asymmetrical configuration of the core diameters to an above-average degree. As a result, vibrations in the rotary cutting tool can be reliably suppressed, which ensures a smooth operation and thus a high surface quality and a long service life. These advantages are especially notable in rotary cutting tools in the form of milling cutters, since in these cutters, the lateral forces during machining are considerably greater and a reduction of the cross-sectional area of the core profile generally leads to an unacceptable weakening of the stability.

According to a useful embodiment of the present invention, the center line of the core profile can extend along a spiral-shaped path throughout the length of the cutting area. The pitch and the diameter of the spiral-shaped path can be varied as required by the particular application, but more particularly, it is possible for the diameter and the pitch to be configured so as to vary throughout the length of the cutting area.

According to an especially useful embodiment of the present invention, the center line extending along the spiral-shaped path can have a central axis which is congruent with the axis of rotation of the rotary cutting tool. However, it is also possible to offset the central axis of the spiral-shaped center line relative to the axis of rotation of the rotary cutting tool.

According to an alternative preferred embodiment, the center line of the core profile can preferably follow a sinusoidal path throughout the length of the cutting area. Most preferably, the sinusoidal center line can be configured in such a manner that it intersects the axis of rotation of the rotary cutting tool. Depending on the configuration of the center line, this line can intersect the axis of rotation only once or also a plurality of times, with the spacing between the points of intersection being uniform or different.

According to another useful embodiment of the present invention, the cross-sectional area of the core profile can decrease in the direction from the shank area to the cutting area. This decrease of the cross-sectional area can be continuous or it can occur in sections having constant cross-sectional areas. In addition, it is also possible to dispose sections with an increasing cross-sectional area in the cutting area, provided that the cross-sectional area overall decreases over the total length of the cutting area. Because of the reduced mass at the free end of the cutting area of the rotary cutting tool, the natural frequency of the cutting area is partially changed, which allows an optimum adjustment to the machining requirements prevailing at any given time.

According to a useful embodiment of the present invention, the core profile can have a circular cross-sectional area or a cross-sectional area that deviates from the circular shape.

To further minimize the tendency toward vibrations, the cutting area can have cutters with varying angles of twist and/or chip breaker flutes extending at right angles relative to the axis of rotation or having the form of a spiral, thereby ensuring that in combination with the excellent damping of vibrations disclosed by the present invention, the risk of vibrations in the rotary cutting tool is reliably reduced.

The external shape of the cutting area of the rotary cutting tool can be cylindrical, conical or curved.

BRIEF DESCRIPTION OF THE DRAWINGS

Additional special features and advantages of the present invention follow from the description of the preferred embodiment examples below with reference to the drawings. The figures show.

DETAILED DESCRIPTION OF THE INVENTION

Figure 1:
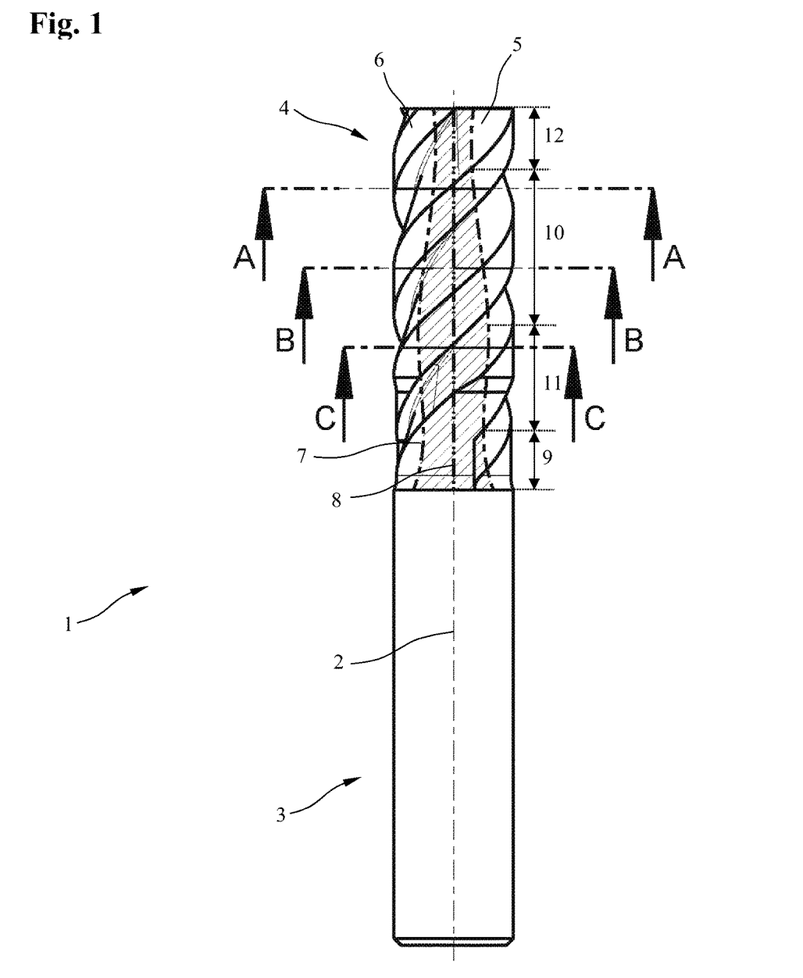
FIG. 1 a schematic diagram of a first rotary cutting tool according to the present invention, having a plurality of alternately disposed sections with an increasing and a decreasing cross-sectional area.

FIG. 1 shows a first rotary cutting tool 1 according the present invention in the form of a cylindrical shank milling cutter which, during machining, rotates about an axis of rotation 2. The rotary cutting tool 1 comprises a shank area 3, by means of which the rotary cutting tool 1 can be affixed into a retaining element of a spindle of a machining center, for example, a multi-axis milling cutter. In addition, the rotary cutting tool 1 also comprises a cutting area 4 having a plurality of cutters 6 that are separated by chip flutes 5. The depth of the chip flutes 5 is bounded by a core profile 7 of the cutting area 4. The core profile 7 is axially symmetrical relative to the axis of rotation 2 so that a center line 8 of the core profile 7, which center line is formed by the middle points of all cross-sectional areas of the core profile 7 throughout the length of the cutting area 4, is congruent with the axis of rotation 2

The core profile 7 of the first rotary cutting tool 1 comprises a plurality of sections 9, 10 with a decreasing cross-sectional area and sections 11, 12 with an increasing cross-sectional area, which sections alternate. In the direction from the shank area 3 to the cutting area 4, the cross-sectional area of the core profile 7 in the first section 9 decreases. This first section 9 is adjoined by the second section 11 in which the cross-sectional area of the core profile 7 increases. The maximum cross-sectional area of the second section 11 is reached in the transition zone to the adjoining third section 10, with this cross-sectional area being smaller than the maximum cross-sectional area of the core profile 7 in the first section 9. In the third section 10, the cross-sectional area again decreases, with the minimum cross-sectional area being reached in the transition zone to the adjoining fourth section 12. This minimum cross-sectional area of the third section 10 is smaller than the minimum cross-sectional area of the first section 9. In the fourth section 12, the cross-sectional area of the core profile 7 again increases up to the free end of the cutting area 4.

Figure 1A:
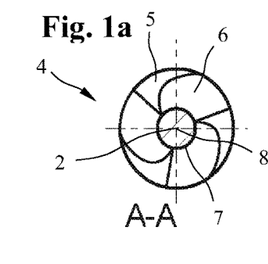
FIG. 1a a sectional view of the first rotary cutting tool according to the present invention along line A-A shown in FIG. 1.
Figure 1B:
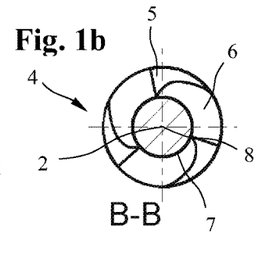
FIG. 1b a sectional view of the first rotary cutting tool according to the present invention along line B-B shown in FIG. 1.
Figure 1C:
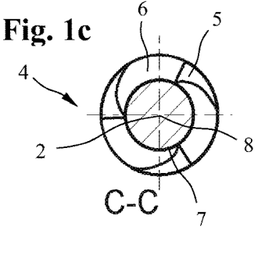
FIG. 1c a sectional view of the first rotary cutting tool according to the present invention along line C-C shown in FIG. 1.

FIGS. 1a to 1c show a number of different sectional views through the cutting area 4 of the first rotary cutting tool 1. FIG. 1a shows the sectional view along line A-A seen in FIG. 1. FIG. 1b shows the sectional view along line B-B seen in FIG. 1. Lastly, FIG. 1c shows the sectional view through line C-C seen in FIG. 1. As FIGS. 1a to 1c indicate, the cross-sectional areas of the core profile 7 are different in size, but always circular in shape and disposed symmetrically relative to the axis of rotation 2 of the rotary cutting tool 1.

As is especially clearly indicated in the sectional views of FIGS. 1a to 1c, the first rotary cutting tool 1 according to the present invention comprises three cutters 6, between each of which a chip flute 5 is disposed. In the radial direction, the chip flutes 5 extend as far as the core profile 7.

The reference characters used to designate elements of the first rotary cutting tool are also used to designate identical elements common to the additional embodiments.

Figure 2:
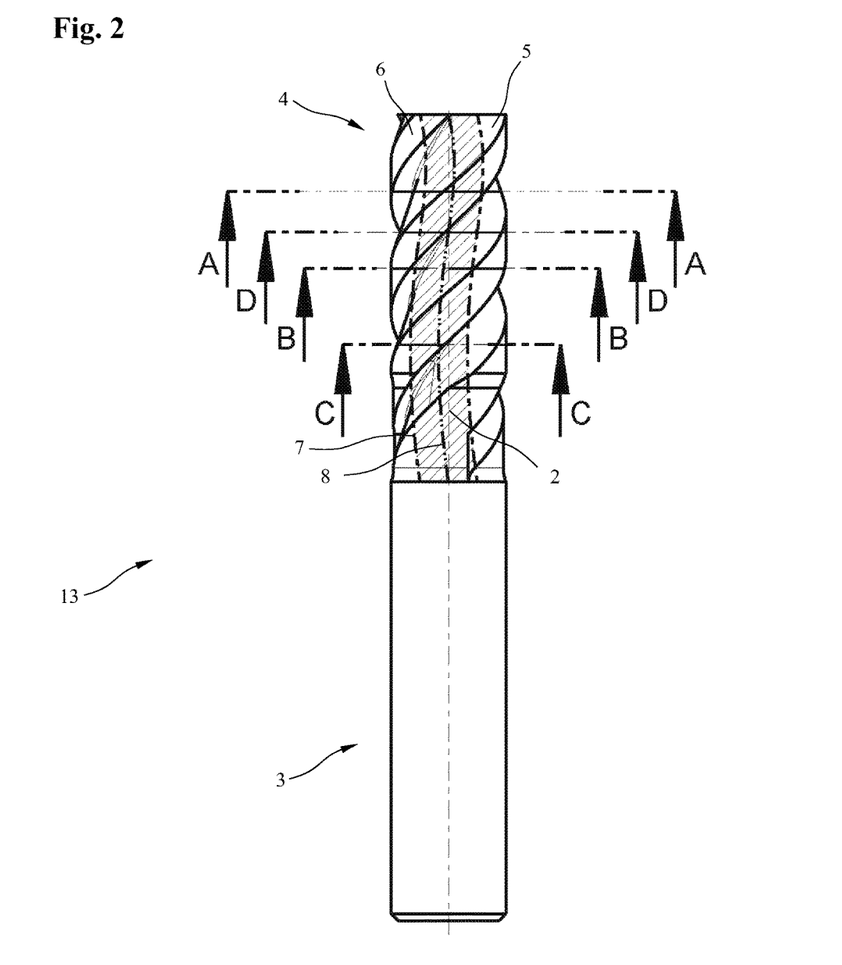
FIG. 2 a schematic diagram of a second first rotary cutting tool according to the present invention with an asymmetrical core diameter.

FIG. 2 shows a second rotary cutting tool 13 according to the present invention. In contrast to the first rotary cutting tool 1, the center line 8 of the core profile 7 follows a path that deviates from the axis of rotation 2 of the rotary cutting tool 1. The center line 8 and the axis of rotation 2 are therefore incongruent, i.e., they do not coincide.

In the second rotary cutting tool 13, the path followed by the center line 8 of the core profile 7 throughout the length of the cutting area 4 is sinusoidal relative to and in the direction of the axis of rotation 2. According to a version not shown in the drawings, the path followed by the center line 8 can, however, also be sinusoidal relative to a reference axis that is offset parallel or at an angle relative to the axis of rotation 2.

Figures 2A, 2B:
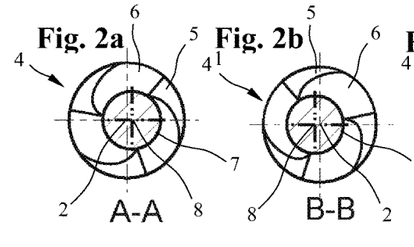
FIG. 2a a sectional view of the second rotary cutting tool according to the present invention along line A-A shown in FIG. 2.
FIG. 2b a sectional view of the second rotary cutting tool according to the present invention along line B-B shown in FIG. 2.
Figures 2C, 2D:
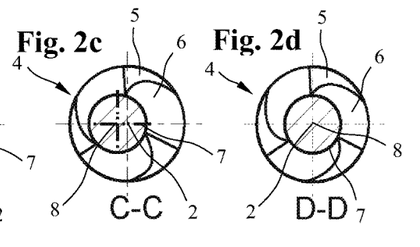
FIG. 2c a sectional view of the second rotary cutting tool according to the present invention along line C-C shown in FIG. 2.
FIG. 2d a sectional view of the second rotary cutting tool according to the present invention along line D-D shown in FIG. 2.

FIGS. 2a to 2d show a number of different sectional views through the cutting area 4 of the second rotary cutting tool 13. FIG. 2a shows the sectional view along line A-A seen in FIG. 2. FIG. 2b shows the sectional view along line B-B seen in FIG. 2. FIG. 2c shows the sectional view along line C-C seen in FIG. 2, and lastly, FIG. 2d shows the sectional view along line D-D seen in FIG. 2. As FIGS. 2a to 2d indicate, the cross-sectional areas of the core profile 7 always have the same size and are circular in form.

As indicated by the sectional views shown in FIGS. 2a to 2c, in these areas, the middle points of the cross-sectional areas of the core profile 7, which middle points form the center line 8, are offset in the horizontal direction relative to the axis of rotation 2. Thus, the reference plane, in which the sinusoidal center line 8 is located, also contains the axis of rotation 2, so that the sinusoidal center line 8 and the axis of rotation 2 intersect in certain areas, as shown, for example, in FIG. 2d. In an embodiment not shown in the drawings, it is possible according to the present invention for the reference plane of the sinusoidal center line 8 to be offset parallel to or at an angle relative to axis of rotation 2. By selecting specific amplitudes and wavelengths for the sinusoidal path, the sinusoidal shape makes it possible to optimally configure the rotary cutting tool 13 for a reduction of the tendency toward vibrations.

Figure 3:
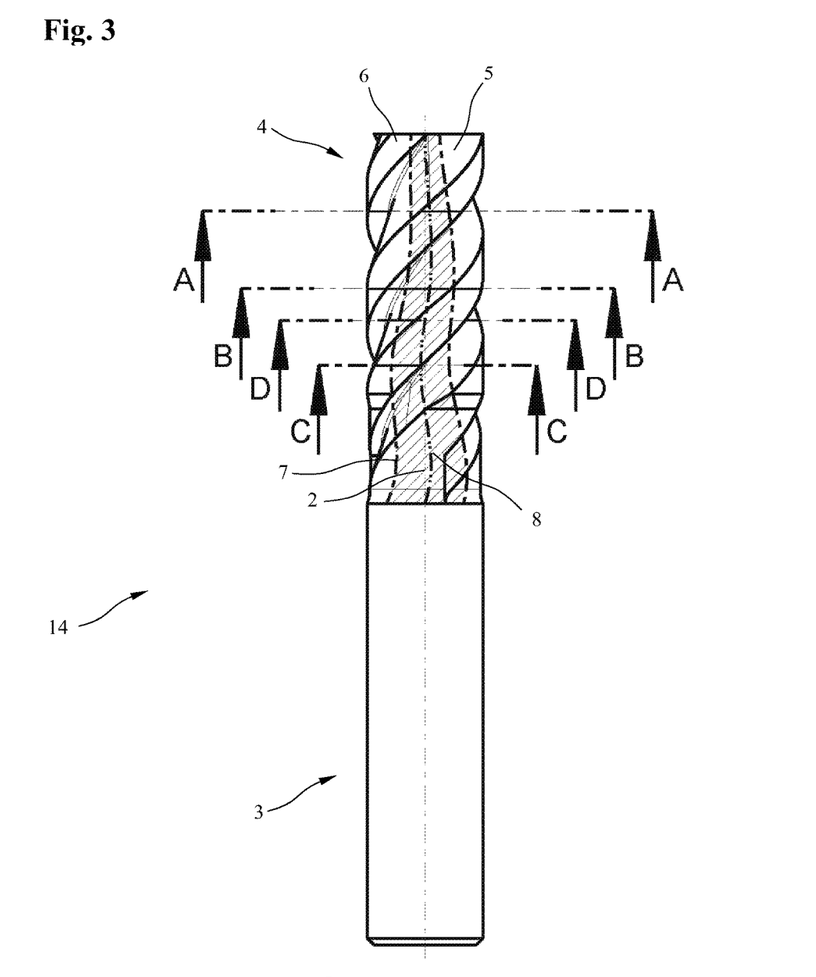
FIG. 3 a schematic diagram of a third rotary cutting tool according to the present invention with an asymmetrical core diameter, the cross-sectional area of which is decreasing.

FIG. 3 shows a schematic diagram of a third rotary cutting tool 14. In contrast to the embodiment presented in FIG. 2, the cross-sectional area of the core profile 7 uniformly decreases throughout the entire length of the cutting area 4 toward the free end of the cutting area 4, i.e., in the direction from the shank area 3 to the cutting area 4. As in the second rotary cutting tool 13 according to the present invention, the center line 8 of the core profile 7 in the third rotary cutting tool 14 according to the present invention, throughout the entire length of the cutting area 4, has a sinusoidal shape relative to and in the direction of the axis of rotation 2.

Figures 3A, 3B:
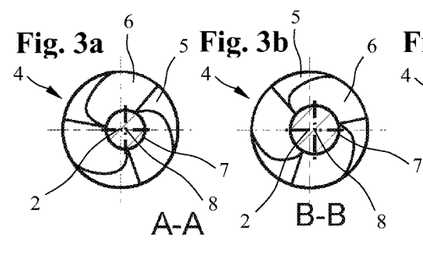
FIG. 3a a sectional view of the third rotary cutting tool according to the present invention along line A-A shown in FIG. 3.
FIG. 3b a sectional view of the third rotary cutting tool according to the present invention along line B-B shown in FIG. 3.
Figures 3C, 3D:
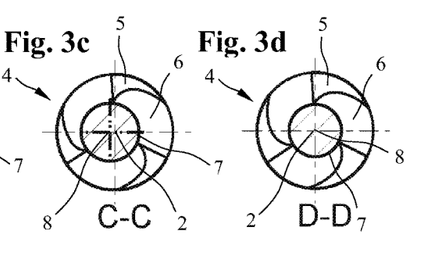
FIG. 3c a sectional view of the third rotary cutting tool according to the present invention along line C-C shown in FIG. 3.
FIG. 3d a sectional view of the third rotary cutting tool according to the present invention along line D-D shown in FIG. 3.

FIGS. 3a to 3d show a number of different sectional views through the cutting area 4 of the third rotary cutting tool 14. FIG. 3a shows the sectional view along line A-A seen in FIG. 3. FIG. 3b shows the sectional view along line B-B seen in FIG. 3. FIG. 3c shows the sectional view along line C-C seen in FIG. 3, and lastly, FIG. 3d shows the sectional view along line D-D seen in FIG. 3. As FIGS. 3a to 3d indicate, the cross-sectional areas of the core profile 7 are different in size but are always circular in shape.

FIGS. 3a to 3d indicate that, as in the second rotary cutting tool 13 according to the present invention, the reference plane for the sinusoidal center line 8 contains the axis of rotation 2. In addition, the cross-sectional area of the core profile 7 continuously decreases from section C-C seen in FIG. 3c to section D-D seen in FIG. 3d, then to section B-B seen in FIG. 3b and finally to section A-A seen in FIG. 3a.

Figure 4:
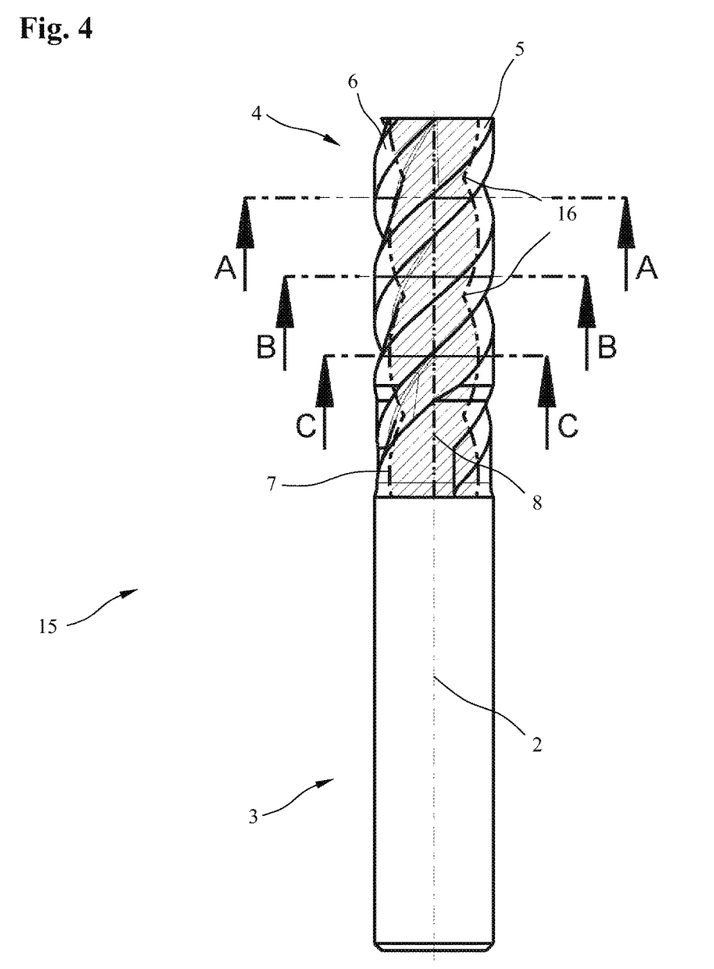
FIG. 4 a schematic diagram of a fifth [sic; fourth] rotary cutting tool according to the present invention with a discontinuous profile of the cross-sectional areas between sections with a decreasing cross-sectional area and sections with an increasing cross-sectional area as well as circular cross-sectional areas.

FIG. 4 shows a schematic diagram of a fourth rotary cutting tool 15 according to the present invention in which the profile of the cross-sectional areas between sections with a decreasing cross-sectional area and sections with an increasing cross-sectional area is discontinuous, i.e., the profile has a kink 16. Between the kinks 16, a section with an increasing cross-sectional area and, adjoining thereto, a section with a decreasing cross-sectional area are disposed. The cross-sectional area increases and decreases in equal measure so that the intermediate zone between the kinks 16 is belly-shaped and has a plane of symmetry at right angles relative to the axis of rotation 2. Such a plane of symmetry, in which the cross-sectional area of the core profile 7 reaches its maximum, is the sectional plane along line C-C.

In addition, the core profile 7 is configured in such a manner that the belly-shaped pattern of the cross-sectional area between two such kinks 16 repeats itself multiple times. The kinks 16 and the radii of the belly-shaped intermediate zones of the core profiles 7 are arranged so as to allow an adjustment to the modes of vibration of the cutting area 4, thereby enabling optimum damping of vibrations.

Figure 4A:
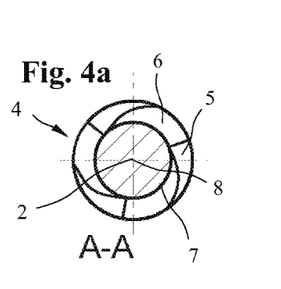
FIG. 4a a sectional view of the fifth rotary cutting tool according to the present invention along line A-A shown in FIG. 4.
Figure 4B:
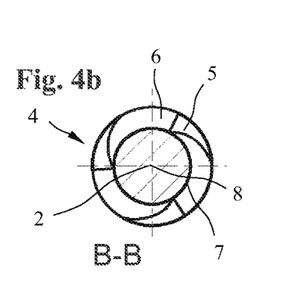
FIG. 4b a sectional view of the fifth rotary cutting tool according to the present invention along line B-B shown in FIG. 4.
Figure 4C:
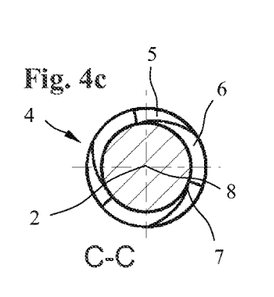
FIG. 4c a sectional view of the fifth rotary cutting tool according to the present invention along line C-C shown in FIG. 4.

FIGS. 4a to 4c show a number of different sectional views through the cutting area 4 of the fourth rotary cutting tool 15. FIG. 4a shows the sectional view along line A-A seen in FIG. 4. FIG. 4b shows the sectional view along line B-B seen in FIG. 4. Lastly, FIG. 4c shows the sectional view along line C-C seen in FIG. 4. As FIGS. 4a to 4d indicate, the cross-sectional areas of the core profile 7 are different in size, but always circular in shape. In addition, the cross-sectional area of the core profile 7 is disposed symmetrically relative to the axis of rotation 2 so that the center line 8 of the core profile 7 and the axis of rotation 2 coincide.

Figure 5:
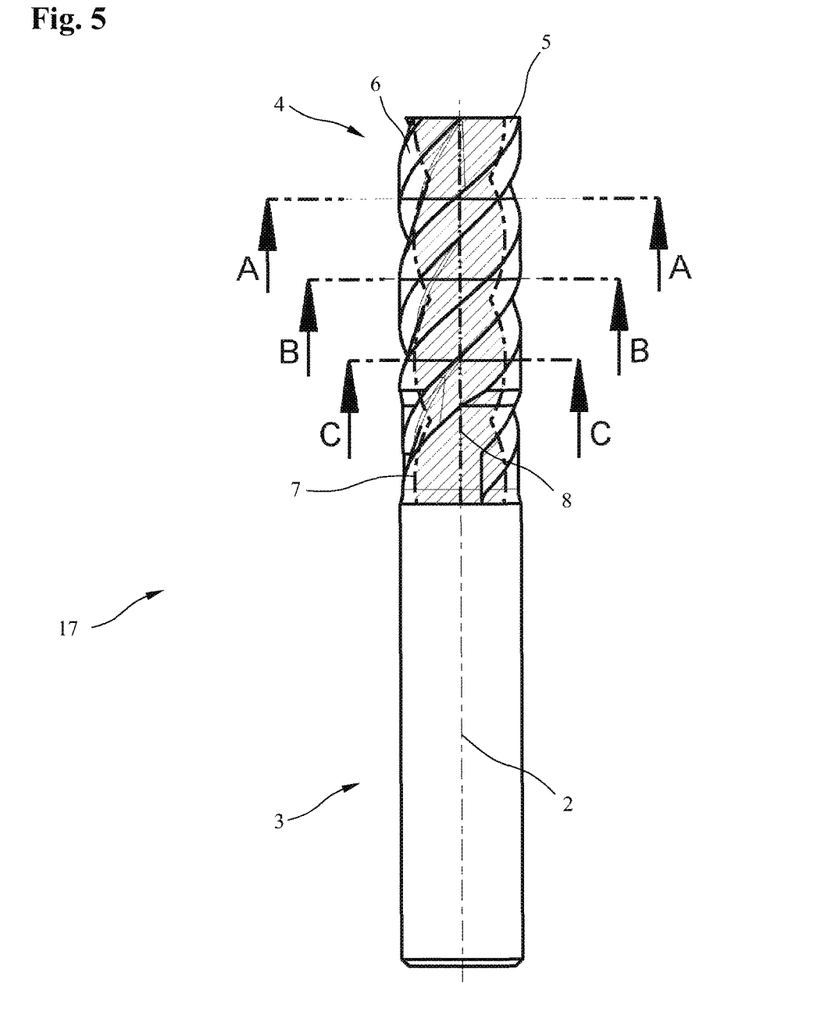
FIG. 5 a schematic diagram of a sixth [sic; fifth] rotary cutting tool according to the present invention with a discontinuous profile of the cross-sectional areas between sections with a decreasing cross-sectional area and sections with an increasing cross-sectional area as well as non-circular cross-sectional areas.

FIG. 5 shows a schematic diagram of a fifth rotary cutting tool 17 according to the present invention in which, in contrast to the fourth rotary cutting tool 15, the cross-sectional area of the core profile 7 is not circular in shape but instead has a shape that deviates from the circular shape.

Figure 5A:
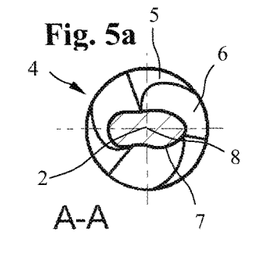
FIG. 5a a sectional view of the sixth rotary cutting tool according to the present invention along line A-A shown in FIG. 5.
Figure 5B:
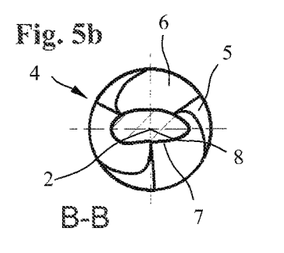
FIG. 5b a sectional view of the sixth rotary cutting tool according to the present invention along line B-B shown in FIG. 5, and FIG. 5c a sectional view of the sixth rotary cutting tool according to the present invention along line C-C shown in FIG. 5.
Figure 5C:
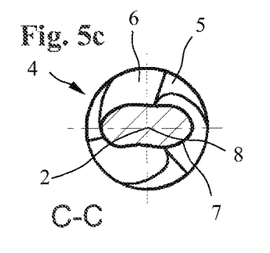

FIGS. 5a to 5c show a number of different sectional views through the cutting area 4 of the fifth rotary cutting tool 17. FIG. 5a show the sectional view along line A-A seen in FIG. 5. FIG. 5b shows the sectional view along line B-B seen in FIG. 5. Lastly, FIG. 5c shows the sectional view along line C-C seen in FIG. 5. As FIGS. 5a to 5c indicate, the cross-sectional area of the core profile 7 has an irregular, elongated shape with a continuously curving surface, which shape changes throughout the length of the cutting area 4. More particularly, the cross-sectional area has an asymmetrical shape, i.e., it has no symmetry. As in the other embodiment examples, the center line 8 is formed by the geometric centroid of the cross-sectional areas of the core profile 7. Since the geometric centroids of the cross-sectional areas are located on the axis of rotation 2, it follows that the center line 8 is congruent with the axis of rotation 2.

The features described in the various embodiment examples can, of course, be easily combined. Thus, a feature of one embodiment example is not limited to that embodiment example. More particularly, the present invention is not limited to the shank milling cutter with cylindrical external shapes of the cutting area described in the embodiment examples; instead, cutting areas with conical or curved external shapes can be used just as well. In addition, other features for reducing the tendency toward vibrations can be added, for example, cutters with varying angles of twist and/or chip breaker flutes extending at right angles relative to the axis of rotation or in the form of a spiral.

To further improve the operation of the rotary cutting tool, the tooth width, i.e., the width of the cutter 6, and/or the width of the chip flute 5 can follow the shape of the cross-sectional area of the core profile 7 or, if the cross-sectional area is circular as shown the drawings, the shape of the core diameter. This means that the width changes with the increasing or decreasing cross-sectional area of the core profile 7 and increases or decreases in a similar ratio or in the same ratio.

The invention claimed is:

1. A milling cutter having an axis of rotation, said milling cutter comprising:
    a shank area; and
    a cutting area that includes a plurality of chip flutes that each reach as far as a core profile, and a plurality of cutters that are separated by the chip flutes,
    wherein a path of a center line of the core profile deviates from the axis of rotation of the milling cutter,
    the core profile, throughout the length of the cutting area, has a plurality of alternately disposed sections with an increasing cross-sectional area and sections with a decreasing cross-sectional area, the center line of the core profile, throughout the length of the cutting area, extends along a spiral-shaped path, and the core profile has a circular cross-sectional area.

2. The milling cutter of claim 1, wherein pitch and diameter of the spiral-shaped path vary throughout the length of the cutting area.

3. The milling cutter of claim 1, wherein the center line extending along the spiral-shaped path has a central axis that is offset relative to the axis of rotation.

4. The milling cutter of claim 1, wherein the cutting area has a cylindrical external shape.

5. The milling cutter of claim 1, wherein the cutting area has a non-cylindrical external shape.

6. The milling cutter of claim 1, wherein the cutters have varying angles of twist.

7. The milling cutter of claim 1, wherein the cutting area has a conical external shape.

8. The milling cutter of claim 1, wherein the cutting area has a curved external shape.

* * * * *